United States Patent Office 3,050,385
Patented Aug. 21, 1962

3,050,385
SLOW RELEASE FERTILIZERS AND THEIR MANUFACTURE
Harry W. Parker, Bartlesville, Okla., assignor to Phillips Petroleum Company, a corporation of Delaware
No Drawing. Filed July 25, 1960, Ser. No. 44,896
6 Claims. (Cl. 71—64)

This invention relates to novel slow release fertilizer compositions and to a method for their manufacture. In one aspect it relates to a composition comprising oil shale as an insolubilizing and support material filled with synthetic fertilizer materials selected from the group consisting of nitrogen, phosphorus, and potassium compounds.

In the prior art, slow release of fertilizer materials to the soil has been attempted by mixing the fertilizer materials with a second inert, or essentially inert, binding material. Thus, peat moss, vermiculite, diatomaceous earth, various siliceous minerals, kieselguhr, and the like, have been suggested for incorporation into fertilizers in an attempt to retard the generally rapid rate of leaching out of the fertilizer material by rainfall and ground water. However, in each of the prior art compositions, the fertilizer constituent is still so readily available that hard rains cause accelerated and wasteful consumption of the highly soluble fertilizer compounds by the plants. Under conditions of soaking rains, the concentration of fertilizer in the vicinity of the plant roots may be so great as to cause actual damage to the plants, just as if unbonded fertilizer had been applied directly to the plants.

On the other hand, much of the distributed fertilizer will remain in solid form during a dry spell, and then when it rains, a good deal of it may be dissolved and washed away by run-off water. Because of uncontrollable rates of solubility in water, the plant nutrients will not be assimilated over an extended period of time, as is preferred, and the full benefit of their application will not be realized. Thus, according to long-established practices the rate of leaching of these fertilizers have been left to the vagaries of nature.

I have discovered that by dispersing and bonding fertilizer materials within an insolubilizing material like oil shale, there is provided a fertilizer composition which will be slowly and uniformly leached and made available to the plant over a relatively long period of time, resulting in more efficient utilization of the fertilizer by the plant. An advantage of the preferred Colorado oil shale is in having a kerogen content within a range which will result in products that are friable. These products will therefore leave residue in the soil which will break down to increase the permeability of the soil.

It is, therefore, an object of this invention to provide an improved composition of matter comprising water soluble synthetic fertilizers having controlled rates of solubility in rain and ground water.

Another object is to provide a novel method of preparing and utilizing such compositions.

A further object is to prepare new plant nutrient-containing compositions which are present in an insolubilizing support from which the nutrient, such as nitrogen, potassium and phosphorus compounds, will be slowly leached by the action of ground water.

It is still another object to provide a support material which will supply available calcium to the soil where needed.

A yet further object is to provide an improved solid, synthetic fertilizer composition having a low rate of solubility in the field, such that it is assimilable over a long period of time.

Various modifications and alterations of this invention will become apparent to those skilled in the art without departing from the scope and spirit of this invention and it should be understood that the latter is not necessarily limited to the aforementioned discussion.

The above objects are achieved, according to this invention, by taking synthetic fertilizers, which are prepared in a manner well known in the art and are very rapidly soluble in water, and admixing them with a comminuted oil shale in the ratio 10–90 parts fertililizer to 90–10 parts oil shale. The resulting mixture may be heated in the range 250–650° F., and may then be pressed at 500–5000 p.s.i. or more, to form a pelleted fertilizer material. It will be preferable to maintain the molding temperature below the decomposition temperature of the fertilizer material, generally in the preferred range of 250–350° F. The pelleted form can then be placed in the soil to provide plant nutrient which will be slowly leached from the pellets, and thereby furnish a sustained fertilizer for periods extending to as much as several weeks.

Illustrative of the nitrogen compounds useful in this invention are: ammonium nitrate, ammonium sulfate, ammoniated superphosphate, ammonium chloride, mono-ammonium phosphate, diammonium phosphate, calcium cyanamide, calcium nitrate, urea guanidine, guanidine nitrate and nitro guanidine.

Illustrative of the phosphorus compounds suitable for the practice of this invention are: ammoniated superphosphate, mono-ammonium phosphate, diammonium phosphate, superphosphate and triple superphosphate.

As examples of the potassium compounds useful in the practice of this invention, are the following: potassium nitrate, muriate of potash (commercial potassium chloride), potassium metaphosphate, sulfate of potash, potassium phosphate and sulfate of potash-magnesia.

It will be noted the foregoing list includes ammonium nitrate which is within the scope of the invention. Certain precautions should be taken where ammonium nitrate is the fertilizer to be mixed with an organic material, such as oil shale. This is because of the well known problem of spontaneous combustion whenever large bulks of ammonium nitrate mixed with organic material are stored or transported over long periods of time. For this reason, this invention may be practiced with ammonium nitrate, preferably in the field, so that the resulting composition may be directly distributed on the soil.

Oil shale is a compact sedimentary rock which is non-flowable at normal temperatures but convertible to volatilizable constituents, or shalt oil, by heating or pyrolysis. In general, oil shales are finely divided, striated materials made up of alternating layers of mineral and organic matter. The mineral matter ranges from pure quartz to highly calcareous matter, including calcite and dolomite. The organic matter in oil shales is known as kerogen, which, translated from the Greek, means "a producer of wax." It is presumably a mixture of high molecular weight compound made up of hydrogen, carbon, nitrogen, oxygen and sulfur. The oil shales range in kerogen characteristics from the benzenoid type, which closely resembles the structure of coal, to the non-benzenoid type which has little, if any, of the structural characteristics of coal. The Colorado oil shale deposits which are of particular interest in this invention belong to the latter classification.

Oil shales containing at least 15 gallons of non-benzenoid structure kerogen per ton of shale are applicable in the process of this invention. There is no upper limit on the kerogen content of the shales to be processed, and shales containing 85 or even 100 gallons of non-benzenoid structure kerogen are applicable for use in our invention, although I prefer a non-benzenoid oil shale, such as the Colorado oil shale deposits. This shale should be ground or crushed so as to pass through a 50–200 mesh screen.

The oil shale to be employed in this invention may be any oil shale, but, as stated, I prefer Colorado oil shales, which have kerogen content in the range of 15 to 60 or more gallons of recoverable shale oil per ton. Sources of some other oil shales suitable for use in the practice of this invention include: Juab, Dragon and Soldier Summit, in Utah; Clay City, Kentucky; Green River, Wyoming; and Ione, California.

It will generally not be desirable in crop fertilization to make the hard, tough, plastic-like materials that are possible with oil shale fertilizer blends, but should a special need arise for this type of material, it will generally be preferable to utilize oil shales having a higher kerogen content within the range of the Colorado variety, an/or higher shale content in the pellets. In other words, the less kerogen content and the less oil shale utilized, the more friable the fertilizer material. Because of the wide variation possible in these fertilizer materials, long term land improvement programs can be undertaken to produce the desired texture and fertility in the soil under the program.

Further objects and advantages of this invention are illustrated by the following example, but the various ingredients, amounts, and conditions described in these examples should not be construed so as to unduly limit this invention.

EXAMPLE

A Colorado oil shale was ground to pass a 120-mesh screen, and the chemical fertilizers were added to the powdered oil shale in a mortar and ground with a pestle until the appearance indicated that the particle size was essentially homogeneous throughout the mixture.

The ground material was pressed in a cylindrical mold having a diameter of 1⅛ inches, at about 5,000 p.s.i. for 2 minutes, at temperatures in the range 250 to 650° F. Shore D hardness and weight were determined on each of the disks.

The disks were placed on a screen support in water and the residual fertilizer was determined after two hours and 20 minutes, or the time of disappearance of the material was noted in the case of the pure fertilizers.

The data are compiled in Table I:

Table I

| Wt. of Disk (Grams) | Composition (Weight Percent) | Time for 100% Solution, Min. | Fertilizer Dissolved after 2 hr. 20 min. (Weight Percent) | Shore D Hardness |
|---|---|---|---|---|
| 6.48 | 100% ammonium sulfate | 8 | | 60 |
| 5.92 | 90% ammonium sulfate, 10% urea. | 10 | | 80 |
| 4.67 | 60% ammonium sulfate, 10% urea, 30% oil shale. | | 94 | 84-81 |
| 9.21 | 90% ammonium sulfate, 10% oil shale. | | 98 | 76-74 |
| 7.6 | 70% ammonium sulfate, 30% oil shale. | | 58 | 74-69 |
| 6.7 | 80% ammonium sulfate, 10% urea, 10% oil shale. | | 100 | 81-79 |
| | 100% oil shale | | | 82-81 |

Having described my invention and having given specific examples within the broad invention, I do not wish to be limited to the specific examples, but rather to the scope of my invention which comprises a fertilizer material consisting of a synthetic fertilizer, or mixture of synthetic and mineral fertilizers, selected from the group set forth in the above discussion; and an oil shale preferably having a kerogen content in the range 15 to 60 or more gallons of recoverable oil shale per ton; and, the process for preparing these novel slow leaching fertilizers by finely dividing the shale and fertilizer, intimately mixing the powder and molding the mixture; often at pressures of 500 to 5000 p.s.i. or more and at temperatures of 250 to 650° F.

I claim:

1. The process for the production of a new fertilizer composition comprising the steps of: comminuting an oil shale; admixing with said oil shale a water soluble synthetic fertilizer material selected from the group consisting of inorganic salts of nitrogen, phosphorous, and potassium; heating the resulting admixture in the range between 250–650° F., and pressing the heated admixture in the range of 500–5000 p.s.i. in a pellet molding zone to form a pelleted fertilizer composition consisting essentially of between 90 and 10 weight percent of said oil shale, and the remainder consisting essentially of between 10 and 90 weight percent of said fertilizer material.

2. The method according to claim 1 wherein said fertilizer material is ammonium sulfate.

3. The method according to claim 1 wherein said fertilizer material is ammonium phosphate.

4. The method according to claim 1 wherein said fertilizer material is potassium nitrate.

5. The method according to claim 1 wherein said oil shale is a Colorado oil shale having a kerogen content in the range of from 15–60 gallons of recoverable shale oil per ton.

6. A fertilizer composition produced by comminuting an oil shale; admixing with said oil shale a water soluble synthetic fertilizer material selected from the group consisting of inorganic salts of nitrogen, phosphorus, and potassium; heating the resulting admixture in the range between 250° to 650° F.; and pressing the heated admixture in the range of 500 to 5000 p.s.i. in a pellet molding zone to form a pelleted fertilizer composition consisting essentially of between 90 and 10 weight percent of said oil shale, and the remainder consisting essentially of between 10 and 90 weight percent of said fertilizer material.

References Cited in the file of this patent

UNITED STATES PATENTS 2,911,295    Peter _____ Nov. 3, 1959

FOREIGN PATENTS 1,280    Great Britain _____ May 24, 1859